US011978351B2

(12) United States Patent
Courbun et al.

(10) Patent No.: US 11,978,351 B2
(45) Date of Patent: May 7, 2024

(54) METHOD AND DEVICE FOR ASSISTING PILOTING OF AN AIRCRAFT MOVING ON THE GROUND

(71) Applicant: Airbus (SAS), Blagnac (FR)

(72) Inventors: Francois Courbun, Blagnac (FR); Mario Cassaro, Toulouse (FR)

(73) Assignee: AIRBUS (SAS), Blagnac (FR)

(*) Notice: Subject to any disclaimer, the term of this patent is extended or adjusted under 35 U.S.C. 154(b) by 386 days.

(21) Appl. No.: 17/358,352

(22) Filed: Jun. 25, 2021

(65) Prior Publication Data

US 2021/0407307 A1 Dec. 30, 2021

(30) Foreign Application Priority Data

Jun. 25, 2020 (FR) ........................................ 2006671

(51) Int. Cl.
*G08G 5/06* (2006.01)
*G01C 23/00* (2006.01)
*G05D 1/00* (2006.01)
*G08G 5/00* (2006.01)

(52) U.S. Cl.
CPC ........... *G08G 5/065* (2013.01); *G01C 23/005* (2013.01); *G05D 1/0083* (2013.01); *G08G 5/0021* (2013.01)

(58) Field of Classification Search
CPC .... G01C 23/005; G05D 1/0083; G08G 5/065; G08G 5/0021
See application file for complete search history.

(56) References Cited

U.S. PATENT DOCUMENTS

| 2009/0150008 | A1  | 6/2009 | Villaume et al. |
| 2009/0150009 | A1* | 6/2009 | Villaume ............... G08G 5/065 701/3 |
| 2011/0046868 | A1  | 2/2011 | Michel et al. |

FOREIGN PATENT DOCUMENTS

FR 2 924 828 6/2009

OTHER PUBLICATIONS

Search Report for FR Application No. 2006671 dated Mar. 10, 2021, 2 pages.

* cited by examiner

*Primary Examiner* — Joseph H Feild
*Assistant Examiner* — Sharmin Akhter
(74) *Attorney, Agent, or Firm* — Nixon & Vanderhye P.C.

(57) ABSTRACT

A beacon unit (2) configured to generate a virtual point (TP) which is moveable along a virtual trajectory (TR), from one or more data item(s) of a kinematics of the aircraft (AC). The device includes a control unit (4) configured to generate an order to move the aircraft towards a dynamic point (TP) and thus along the target trajectory (TR).

18 Claims, 2 Drawing Sheets

| Vground in kts | Radius in m |
|---|---|
| 5 | 22 |
| 7 | 25.2 |
| 10 | 30 |
| 15 | 37.5 |
| 20 | 40 |
| 25 | 50 |
| 30 | 60 |

METHOD AND DEVICE FOR ASSISTING PILOTING OF AN AIRCRAFT MOVING ON THE GROUND

RELATED APPLICATION

This application claims priority to French Patent Application 2006671 filed Jun. 25, 2020, the entirety of which is incorporated by reference.

TECHNICAL FIELD

The present invention relates to a method and a device for assisting the piloting of an aircraft moving on the ground. It relates in particular to the automation of movements carried out by an aircraft during a movement on the ground.

The present invention may be used in civilian or military aircraft for transporting passengers or goods (freight), or in a drone which moves over an area, in particular an aircraft-related area, such as an airport or an aerodrome.

BACKGROUND

During the movement phase of an aircraft on the ground, the pilot has to follow a travel path by controlling longitudinal and lateral movements, and the yaw of the aircraft, whilst ensuring that the aircraft follows the intended travel path.

Furthermore, the pilot has to monitor the external environment. In particular, for a movement of the aircraft on an aircraft-related area, the pilot has to monitor for example:
  other vehicles moving at outskirts of the travel path of the pilot's aircraft, such as other aircraft travelling on the ground, taking off or landing, and other vehicles such as cars and trucks; and
  obstacles near the travel path which the aircraft must avoid to prevent a collision. The obstacles may be buildings, walkways, antennae and other instruments protruding from the ground, signboards and signaling boards, and the other vehicles that may be stopped or moving.

A pilot controls manually movements of the aircraft on the ground, including controlling the speed and acceleration of the aircraft. To control the aircraft movements, the pilot engages control inputs, such as operating levers and pedals in the cockpit of the aircraft. Other control inputs in the cockpit may include a steering wheel for the nose wheel and a rudder bar to control the rudder on the empennage to control the aircraft's lateral movements, e.g., turns, and yaw. These control inputs enable actuators of the aircraft to actuate brakes, landing gear steering, aerodynamic control surfaces, thrust and other devices on the aircraft that determine the movement of the aircraft on the ground. In particular, engines, brakes, rudder and steering the nose landing gear are actuated to control movement of the aircraft on the ground.

The manual control of the aircraft via the control inputs requires significant attention from the pilot, sometimes to the detriment of other tasks performed by the pilot such as observing the external environment surrounding the aircraft. The attention required to control the movement of the aircraft may be a disadvantage under conditions which impair the visibility of the external environment, particularly at night; or during unfavorable weather conditions, for example, in foggy weather, snow, rain and storms. If the pilot becomes distracted while manually controlling the aircraft on the ground, the aircraft may deviate from the intended ground travel path or the aircraft may collide with other vehicles or obstacles which may result in significant damage to property and humans.

Furthermore, controlling the ground movement of aircraft with extended lengths, such as with many types of commercial and military aircraft, may be difficult, in particular around bends in the ground travel path, as a result of the long wheelbase between the front and rear wheels on the aircraft Thus, it can be difficult for a pilot to operate the aircraft in a safe manner and while ensuring that all the portions in contact with the ground, e.g., wheels, remain on the intended travel path.

To assist the pilot to manually control an aircraft on the ground, the aircraft may have additional aids, such as external cameras on-board the aircraft which capture real time images (frames) of portions of the aircraft on the ground enable the pilot to verify that the wheels, such as the wheels of the nose gear, do not leave the intended travel path. Such cameras are used on AIRBUS® transport planes such as the A380 and A350 family of aircraft models.

To lighten the workload of the pilot during the movement phase of the aircraft on the ground, it is known from the document French patent application FR 2924828 discloses automatically determining a travel path on the ground for an aircraft based on information received from air traffic control, and a yaw speed specification. However, determining a travel path does not necessarily reduce the burden on a pilot to manually control an aircraft to follow the travel path.

SUMMARY

There is a long felt need to reduce the manual actions carried out by a pilot as an aircraft moves along the ground. An invention, disclosed herein, has been developed to eliminate or reduce the need for a pilot to request assistance of operation of an aircraft as it moves along the ground.

A method has been invented that includes:
  a first step carried out by a beacon unit and which enables generation of a virtual point, referred to as a dynamic point, and which can be moved along a virtual trajectory, referred to as a target trajectory, based on one or more data item(s) of a kinematics of the aircraft, and
  a second step carried out by a control unit and using the dynamic point to generate an order, e.g., command, that the aircraft be driven, e.g., automatically driven, towards a physical point on the ground corresponding to the dynamic point and thus to move the aircraft along the target trajectory.

To determine the dynamic point, the aircraft has its own guiding beacon during a phase of movement on the ground. This method enables the dependence of the aircraft with regard to physical reference points produced on the ground to be reduced. This makes the guiding more reliable and minimizes the manual actions which the pilot has to carry out. The pilot can then concentrate more on monitoring the external environment of the aircraft.

In the context of the present invention, it is possible in particular to envisage several sub-steps in each of the steps set out above, the sub-steps being able to be combined with each other.

The first step may comprise a sub-step of selecting a travel path (route) from several possible travel paths on an aircraft-related area, wherein the selected path includes a target trajectory of a path that moves the aircraft to an intended destination on the ground. This sub-step of selection is carried out using a human/machine interface which communicates with the beacon unit.

The first step may include a sub-step of generating a virtual circle which is carried out by a navigation unit which is integrated in the beacon unit. In particular, the virtual circle has a center which is positioned at a point, which is referred to as the follower point and which is attached to the aircraft. Furthermore, the virtual circle forms with the target trajectory at least one intersection point which corresponds to the dynamic point.

The follower point may correspond to a center of gravity of the aircraft.

Furthermore, the sub-step of determining the virtual circle may include an operation for determining a radius of the circle. In particular, this radius is dependent on a speed and/or acceleration of the aircraft. Furthermore, this radius may have a length less than a length of the aircraft so that, in the region of a bend of the target trajectory, a wheel of the nose landing gear of the aircraft is positioned in front of the dynamic point.

This feature of the radius of the virtual circle is brought about by the selection of the center of gravity of the aircraft as a follower point. As a result of this feature, the method drives the aircraft in accordance with the target trajectory in a progressive manner.

In a second embodiment, the first step may include a sub-step of determination which is carried out by the navigation unit and which involves determining a reference angle which is referred to as the azimuth and which is formed by a straight line which joins the dynamic point and the follower point, and an axis of a local reference system which is connected to the dynamic point. The azimuth is taken into account in the order.

In a third embodiment which complements the second embodiment, the first step comprises a sub-step which enables an azimuth error associated with the azimuth to be determined. The azimuth error is defined by an angle formed between a longitudinal axis of the aircraft comprising the follower point and the straight line which joins the dynamic point and the follower point. Furthermore, the azimuth error is taken account in the order. This enables a lateral deviation and/or an angular deviation of the aircraft relative to the target trajectory to be rectified automatically.

In particular, this sub-step is carried out by a guiding unit which is integrated in the beacon unit.

In a fourth embodiment which complements the third embodiment, the first step comprises a sub-step of consolidation, which involves determining a consolidated value of the azimuth, by means of a comparison between a first value of the azimuth and a second value of the azimuth, and by taking into account a validity and a covariance of the first and second values. The consolidated value is taken into account in the order. In particular, the sub-step of consolidation is carried out by means of a consolidation unit which is integrated in the beacon unit.

The second step may include a sub-step of generating a first command for movement of the nose landing gear toward the target trajectory. This first command is generated from the order and, may include an instruction taking into account the consolidated value of the azimuth.

The second step may include a sub-step of converting the first command into a second command of a steering wheel of the aircraft.

The present invention also relates to a device for assisting the operation of an aircraft moving on the ground.

The invention may be embodied as a device include:
a beacon unit which is configured to generate a virtual point which is referred to as a dynamic point and which can be moved on a virtual trajectory which is referred to as a target trajectory, based on one or more data item(s) of a kinematics of the aircraft,
a control unit which is configured to generate an order, e.g., guidance command, based on the dynamic point, and enabling the aircraft to be driven along the target trajectory.

The beacon unit may be configured to select a travel path (route) from several possible itineraries on an aircraft-related area, the travel path comprising the target trajectory. To this end, the beacon unit may be connected to a human/machine interface.

The beacon unit may include a navigation unit which is configured to generate a virtual circle which has a center which is positioned at a point which is referred to as the follower point and which is attached to the aircraft. This virtual circle forms with the target trajectory at least one intersection point which corresponds to the dynamic point.

The navigation unit may be configured to determine a radius of the virtual circle. In particular, this radius is dependent on a speed and/or acceleration of the aircraft.

In a second embodiment which complements the preceding embodiment, the navigation unit is configured to determine a reference angle which is referred to as the azimuth and which is formed between a straight line which joins the dynamic point and the follower point, and an axis of a local reference system which is connected to the dynamic point. The azimuth is intended to be taken into account in the order.

In a third embodiment which complements the second embodiment, the beacon unit comprises a guiding unit which is configured to determine an azimuth error which is associated with the azimuth. The azimuth error includes an angle formed between a longitudinal axis of the aircraft and a straight line between the follower point and the dynamic point. The azimuth error is intended to be taken into account in generating the order, e.g., command, to direct the movement of the aircraft. This enables a lateral deviation and/or an angular deviation of the aircraft relative to the target trajectory to be rectified automatically.

In a fourth embodiment which complements the preceding embodiments, the beacon unit comprises a consolidation unit which is configured to provide a consolidated value of the azimuth by means of comparison between a first value of the azimuth and a second value of the azimuth and by taking into account a validity and a covariance of the first and second values. The consolidated value is intended to be taken into account in the order.

The control unit may be configured to generate, from the order, a first command for moving a nose landing gear of the aircraft to the target trajectory and, optionally, in accordance with the consolidated value of the azimuth.

The control unit may be configured to convert the first command into a second command of a steering wheel of the aircraft.

The present invention further relates to an aircraft, in particular a transport plane, which is equipped with a device as mentioned above.

SUMMARY OF FIGURES

The appended Figures will assist in understanding the invention and its operation. In these Figures, elements which are similar have been given identical reference numerals.

DETAILED DESCRIPTION

Figure 1:
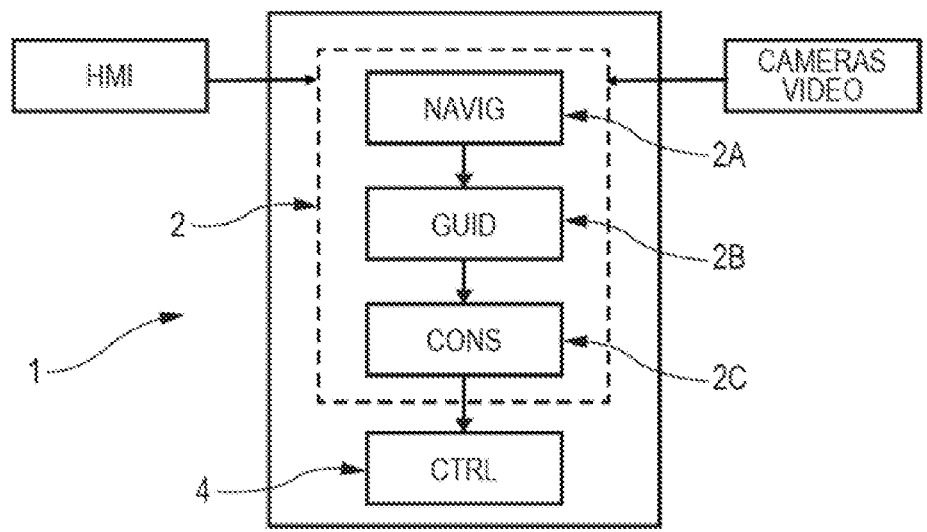
FIG. 1 is a block diagram of a specific embodiment of a device for assisting the piloting of an aircraft moving on the ground according to the invention.
Figure 2:
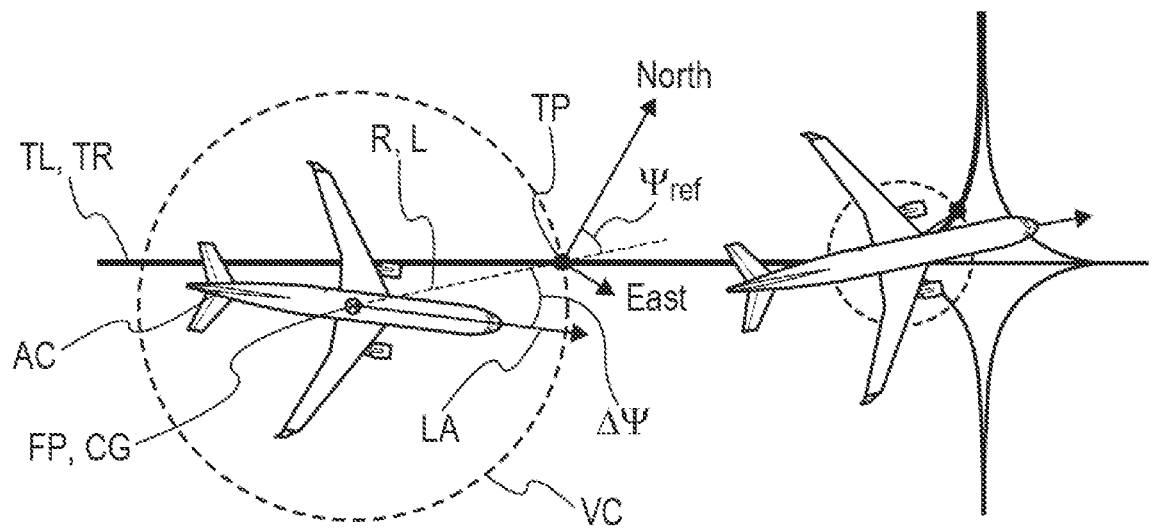
FIG. 2 is a schematic view of an aircraft moving along a virtual trajectory on the ground according to an embodiment of the method according to the invention.

The device 1 schematically illustrated in FIG. 1 relates to a device for assisting operation of an aircraft AC moving on the ground, in particular travelling along a taxiing path at an airport.

The device 1 comprises a beacon unit 2 which is configured to generate on the virtual trajectory TR and a virtual point TP which can be moved on the virtual trajectory. The virtual trajectory TR and virtual point TP have corresponding taxi line TL and follower point FP which are the physical path and physical aircraft position on the ground.

The device 1 also comprises a control unit 4 which is configured to generate an order from the virtual point TP which enables the aircraft AC to be driven automatically along the virtual trajectory TR.

The virtual trajectory TR will be referred to as the target trajectory. The virtual point TP will be referred to as the dynamic point. The virtual trajectory and virtual point are paths and a point, respectively, in a digital virtual world of an airport or other ground environment over which an aircraft may travel while on the ground.

The term "ground" is a physical ground (earth surface) that may be an airport or other area dedicated for aircraft movement. The ground may be covered with tarmac over which aircraft travel. The tarmac may include elements forming aircraft paths such as: landing strips and take-off strips, travel paths or taxiways, reversing loops, waiting zones, maneuvering areas and parking areas.

The aircraft move over these paths while on the ground and typically move from one element of the paths to another while leaving from a starting point, e.g., a landing strip, and moving toward an arrival point, e.g., a gate at a terminal. The aircraft follows a selected travel path as it moves over the elements of the aircraft ground tarmac.

A beacon unit 2 may be configured to select a desired travel path for the aircraft movement on the ground. The beacon unit 2 may be a computer configured to access stored digital maps of an airport and obtain positioning information of the aircraft such as from a global positioning satellite (GPS) system or an internal guidance system on-board the aircraft. The beacon unit 2 is connected to a human/machine interface (HMI) and is able to display a map of the ground, or more generally a map of an aircraft-related area AMDB ("Airport Map DataBase"). The HMI system may allow a pilot to select a desired travel path for the aircraft to follow on the ground, or the desired travel path may be automatically selected by the beacon unit such as by using information provided by an air traffic control system providing guidance for aircraft moving on the ground of an airport.

On the travel path selected in this manner, the beacon unit 2 generates the target trajectory TR and the dynamic point TP, for example, from information relating to a longitudinal speed $V_{ground}$ and/or a longitudinal acceleration $n_x$ of the aircraft AC. The beacon unit 2 comprises a navigation unit 2A which communicates, in particular, with sensors on board the aircraft AC and/or with specific cameras which form a hybrid vision module. The hybrid vision module is configured to provide video or sequence of images suitable for processing by algorithms which analyze video or images to detect ground features in the video or images.

The target trajectory TR is defined by a virtual line formed from a sequence of geographical reference points along an intended travel path of the aircraft, such as a taxiing path at an airport. These reference points are spaced apart from each other by gaps that vary in distance according to a radius of curvature of the target trajectory TR. The target trajectory TR may be formed along a central position between lateral edges which delimit the travel path. The target trajectory TR may be superimposed on a travel line TL, e.g., a taxi line marked on the ground or otherwise defined in the absence of physical markings on the ground.

The dynamic point TP is defined by an intersection point formed by two mathematical expressions, expressed in the same reference system and coordinate system, one describing the target trajectory TR and the other describing a virtual circle VC which is connected to the aircraft.

The virtual circle VC has a center dependent on a data item relating to the kinematics of the aircraft AC. The center of the virtual circle VC may coincide with a follower point FP on the aircraft AC. The follower point FP may correspond to a center of gravity CG of the aircraft AC.

The virtual circle VC has a radius R dependent on at least one other data item relating to the kinematics of the aircraft. The kinematics may be the current velocity and/or acceleration of the aircraft in the direction of the taxi line that the aircraft is following.

The radius of the virtual circle may be defined by the following expression:

$$R = K_1 * V_{ground} + K_2 * V_{ground}$$

where $V_{ground}$ is the longitudinal speed of the aircraft AC;
$K_1$ is a variable which is dependent on the longitudinal speed $V_{ground}$; and
$K_2$ is a variable which is dependent on the longitudinal acceleration $n_x$.

The variables $K_1$ and $K_2$ are selected based to comply with a criteria of stability and convergence during a calculation of the radius R. For example, if the acceleration $n_x$ is low or if the aircraft is braking, the variable $K_2$ be a zero value which thus leads to a simplified expression of the radius R.

Figures 3, 4:
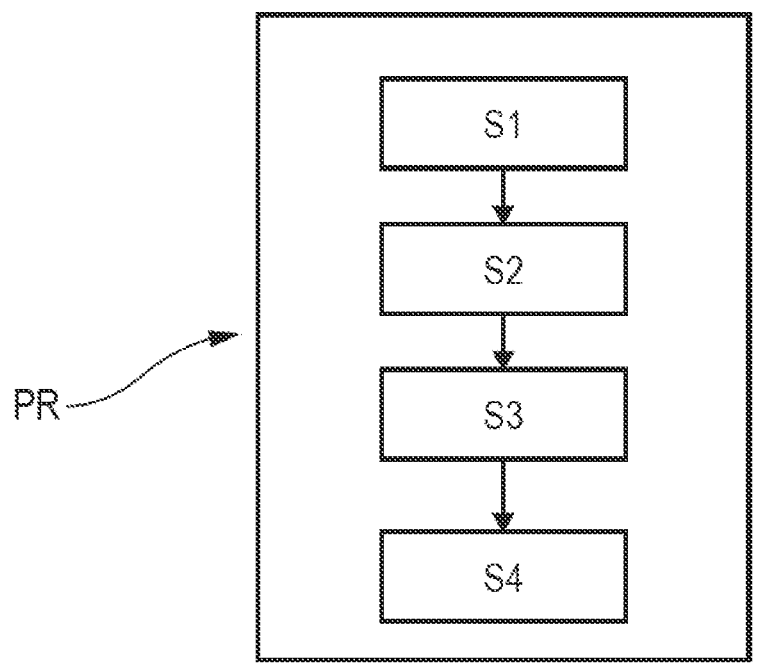
FIG. 3 shows a variation table of a radius of a virtual circle as a function of a longitudinal speed of an aircraft.
FIG. 4 is a flow chart of steps in a method for assisting the piloting of an aircraft moving on the ground, implemented by the device of FIG. 1.

FIG. 3 is a table showing the variation of the radius R in accordance with the longitudinal speed $V_{ground}$ of the aircraft AC for a zero value of the variable $K_2$, and for a specific aircraft. The radius R increases with the longitudinal speed $V_{ground}$ in accordance with a non-linear law to ensure the stability of the guiding system.

After the virtual circle VC has been generated, the navigation unit 2A verifies the conformity of the virtual circle. This involves determining whether the circle VC effectively meets the target trajectory TR. If so, the virtual circle VC is said to comply. Otherwise, a new calculation is required to achieve a compliant virtual circle VC.

A compliant virtual circle VC may intersect the target trajectory TR at several points of intersection only one of which corresponds to the dynamic point TP. The point of intersection corresponding to the dynamic point TP is point of intersection closest to a destination of the aircraft AC following the target trajectory TR.

A straight line L joins the dynamic point TP and the follower point FP, on the one hand. A local reference system, such as a NED reference system ("North, East, Down") may be located at the dynamic point. The navigation unit 2A enables, e.g., calculates, an azimuth reference angle $\psi_{ref}$. The azimuth $\psi_{ref}$ may be defined as the angle between the straight line L and the North axis of the reference system NED.

The straight line L forms with a longitudinal axis LA of the aircraft AC comprising the follower point FP an angle which is referred to as the azimuth error $\Delta\psi$ and which is associated with the azimuth $\psi_{ref}$. The azimuth error $\Delta\psi$ corresponds to a difference between a desired position of the aircraft AC, given by the dynamic point TP along the target trajectory TR, and a current position of the aircraft AC, given by the follower point FP. More specifically, the azimuth error $\Delta\psi$ translates a combination of two deviations of the aircraft AC relative to the target trajectory TR: a lateral deviation and an angular deviation.

Particularly when the follower point FP is located on the trajectory TR, but the aircraft AC is orientated differently, the azimuth error $\Delta\psi$ comprises only an angular component and does not have a lateral deviation, e.g., lateral deviation equals zero. When the follower point FP is offset from the target trajectory TR and the aircraft AC is parallel with the target trajectory TR at a point on the TR corresponding to the FP, the azimuth error $\Delta\psi$ comprises only a linear component and the angular component is zero degrees. If the aircraft is both offset laterally from the trajectory TR and is not parallel to the target trajectory TR at the point corresponding to the FP, the azimuth error $\Delta\psi$ has both a non-zero linear component, e.g., positive or negative (left or right) distance from the target trajectory TR along a line perpendicular to the TR, and a non-zero angular component. The azimuth error $\Delta\psi$ is zero for both the linear and angular components if the aircraft FP is on the target trajectory TR and the aircraft is parallel to the TR at a point corresponding to the FP.

The azimuth error $\Delta\psi$ is determined using a guiding unit 2B integrated in the beacon unit 2. The guiding unit may be a software and/or hardware computer module integrated into the beacon unit. The guiding unit The azimuth reference $\psi_{ref}$ and/or the azimuth error $\Delta\psi$, where applicable in combination with other values, provides input data item of the control unit 4 which permits the control unit to generate the order, e.g., command to move the aircraft along a certain path. The certain path may be along the TR, if the aircraft is already on the TR, and may direct the aircraft towards the TR, if the aircraft is laterally offset from the TR. The command may also include steering commands to direct the nose gear wheel to turn in a certain direction to follow the TR and to orient the aircraft to be parallel to the TR. The order may include a first command intended for a nose landing gear wheel NWS ("Nose Wheel Steering"), then a second command intended for a steering wheel SHW ("Steering Hand Wheel"). The control unit 4 may be a software and/or hardware computer module of a computer navigation and/or automatic pilot system onboard the aircraft.

The control unit 4 may be configured to communicate with the actuators of the aircraft AC, e.g., actuators controlling ground movement such as brakes, rudder, nose wheel steering and engine throttle. By communicating with the actuators the control unit 4 may automatically cause the aircraft to move along a path and/or direct indicated in the order generated by the control unit.

The beacon unit 2 may further comprise a consolidation unit 2C, e.g., software module and/or computer hardware, configured to determine a consolidated value of the azimuth $\psi_{ref}$, via a comparison between several independent measurements of the same parameter. In the minimum case of two available measurements, a first value of the azimuth $\psi_{ref}$ obtained using the navigation unit 2A is compared with a second value of the azimuth $\psi_{ref}$ obtained using a third unit 2A'. The consolidation unit 2c, navigation unit 2A and third unit 2A' may be software and/or computer hardware modules integrated with the beacon unit.

In particular, the third unit 2A' may or may not be integrated in the device 1. The third unit 2A' determines the second value of the azimuth $\psi_{ref}$ using sensors and/or algorithms which are different from those used by the navigation unit 2A in order to determine the first value of the azimuth $\psi_{ref}$.

In this embodiment, the consolidation unit 2C communicates the consolidated value of the azimuth $\psi_{ref}$ to the control unit 4. The consolidation unit 2C thus forms an interface between the navigation/guiding unit 2A/2B and the control unit 4.

The aircraft AC may comprise a device 1 according to any one of the embodiments described above.

The device 1, as described above, is capable of implementing a method PR for assisting in the operation of an aircraft AC moving on the ground.

As illustrated in FIG. 4, this method PR comprises:
a first step S1 which is carried out by a beacon unit 2 and which enables generation of a virtual point TP which is referred to as a dynamic point and which can be moved on a virtual trajectory TR, which is referred to as a target trajectory, based on one or more data item(s) of a kinematics of the aircraft AC;
A second step S4 which is carried out by a control unit 4 and which involves generating an order for movement of the aircraft towards the dynamic point TP, enabling the aircraft AC to be driven along the target trajectory TR.

The first step S1 may comprise a first sub-step which involves selecting a travel path on the ground from several possible itineraries on an aircraft-related area, the route comprising the target trajectory TR. In particular, this first sub-step is carried out by a human/machine interface HMI which communicates with the beacon unit 2.

More specifically, during this first sub-step, the human/machine interface HMI displays in particular a map of the ground, and more generally a map of the aircraft-related area AMDB ("Airport Map DataBase"). The human/machine interface HMI also displays a position and an orientation of the aircraft AC on the travel path.

It should be noted that the human/machine interface HMI may be a module which is internal or external with respect to the beacon unit 2.

The first step S1 may include a second sub-step, involving generating a virtual circle VC which forms with the target trajectory TR at least one intersection point, the intersection point corresponding to the dynamic point TP. In particular, this second sub-step is carried out by a navigation unit 2A which is integrated in the beacon unit 2.

During operation, the navigation unit 2A determines a follower point FP associated with the aircraft AC. The follower point FP may be the center of gravity of the aircraft. The follower point FP becomes a center of the virtual circle VC. The navigation unit 2A determines a radius R of the virtual circle VC. The radius is dependent on a longitudinal speed $V_{ground}$ and/or a longitudinal acceleration $n_x$ of the aircraft AC. The navigation unit 2A generates a mathematical expression which is associated with the virtual circle VC and which is expressed in the same reference system and coordinate system of the target trajectory TR.

After the virtual circle VC has been formed, the navigation unit 2A verifies that the circle VC intersects with the target trajectory TR. If so, the virtual circle VC is said to comply. Otherwise, the navigation unit 2 repeats the calculation of the radius R until a compliant virtual circle VC is obtained.

The target trajectory TR and the virtual circle VC may have a plurality of intersection points. According to a complementary embodiment of the preceding embodiment, therefore, the first step S1 comprises a third sub-step which involves distinguishing between the intersection points and identifying which of the intersection points is the dynamic point TP. The intersection point to be designated as the dynamic point TP is the intersection point closest to a destination of the aircraft AC, assuming the aircraft follows the target trajectory TR.

The first step S1 may include a fourth sub-step which involves determining an azimuth reference angle $\psi_{ref}$ formed between a straight line L which joins the dynamic point TP and the follower point FP, and an axis of a local reference system which is referred to as the NED reference system ("North, East, Down") and which is connected to the dynamic point TP. The azimuth $\psi_{ref}$ may be formed between the straight line L and the North axis ("North") of the reference system NED. It should be noted that the azimuth reference angle $\psi_{ref}$ is taken into account in the order.

The second step S4 may comprise:
a first sub-step which involves generating, from the order, a first command to move, e.g. steer, a nose landing gear wheel NWS ("Nose Wheel Steering") of the aircraft AC along the target trajectory TR; and/or
a second sub-step which involves converting the first command into a second command to control a steering wheel SHW ("Steering Hand Wheel") of the aircraft AC. During this second step S4, the control unit 4, which results in the first command and/or the second command, communicates with actuators of the aircraft AC to initiate the movement of the aircraft AC along the target trajectory TR in accordance with the first and second commands.

The method PR comprises an intermediate step S2 which involves determining an azimuth error $\Delta\psi$ associated with the azimuth reference angle $\psi_{ref}$. The azimuth error $\Delta\psi$ translates a difference between a desired position of the aircraft AC, given by the dynamic point TP along the target trajectory TR, and a current position of the aircraft, given by the follower point FP. The azimuth error $\Delta\psi$ may represent a lateral deviation and/or an angular deviation of the aircraft AC relative to the target trajectory TR. The azimuth error $\Delta\psi$ is defined by an angle formed between the straight line L which joins the dynamic point TP and the follower point FP, on the one hand; and the longitudinal axis LA of the aircraft AC passing through the follower point FP, on the other hand. It should be noted that the azimuth error $\Delta\psi$ is taken into account in the order.

The intermediate step S2 is carried out by a guiding unit 2B which is integrated in the beacon unit 2. The intermediate step S2 may be considered to be a sub-step of the first step S1.

The method PR may include a second intermediate step S3 which involves determining a consolidated value of the azimuth reference angle $\psi_{ref}$. This second intermediate step S3 is carried out by a consolidation unit 2C integrated in the beacon unit 2.

During this second intermediate step S3, the consolidation unit 2C compares a first value of the azimuth reference angle $\psi_{ref}$ provided by the navigation unit 2A, with a second value $\psi_{ref}$ of the azimuth reference angle, provided by a third navigation unit 2A'. In particular, the consolidation unit 2C takes into account a validity and a covariance of the first value and the second value of the azimuth reference angles $\psi_{ref}$.

A third navigation unit 2A' is intended to be understood to be any unit which enables the second value of the azimuth reference angle $\psi_{ref}$ to be determined using sensors and/or algorithms different from the ones used by the navigation unit 2A in the determination of the first value of the azimuth reference angle $\psi_{ref}$.

The determination of the consolidated value of the azimuth reference angle $\psi_{ref}$ may be considered to be a sub-step of the first step S1.

The method PR is carried out in an iterative manner along the entire path on the ground of the aircraft AC so that it progresses toward its destination whilst being as close as possible to or on the target trajectory TR, in particular with the value of the azimuth error $\Delta\psi$ tending toward zero degrees (0°).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assisting the operation of an aircraft moving on the ground, comprising:
generating a virtual follower point representing a position of the aircraft,
generating a virtual circle having a center positioned at the virtual follower point and having a radius based on a current speed and/or a current acceleration of the aircraft,
generating a virtual dynamic point designating a desired position of the aircraft based on an intersection of a virtual target trajectory of the aircraft and the virtual circle, wherein the generation of the virtual dynamic point is further based on data representing kinematics of the aircraft, and
generating an order with information to direct the aircraft to move towards the virtual dynamic point on the virtual target trajectory.

2. The method of claim 1, further comprising:
selecting a selected travel path from a plurality of travel paths stored digitally, wherein the selection is made based on manual inputs entered through a human/machine interface onboard the aircraft, and
generating the virtual target trajectory using the selected travel path.

3. The method of claim 1, further comprising:
determining an azimuth reference angle ($\Psi$ref) which is an angle between a straight line between the dynamic point and the follower point and an axis of a local reference system centered on the virtual dynamic point, and using the azimuth reference angle ($\Psi$ref) to generate the order and the order incudes directional information to guide ground movement of the aircraft with respect to the local reference system.

4. The method of claim 3, further comprising determining an azimuth error ($\Delta\Psi$) as an angle between the straight line joining the dynamic point and the follower point, and a longitudinal axis of the aircraft, wherein the azimuth error ($\Delta\Psi$) is used to generate the order.

5. The method of claim 4, further comprising generating a consolidated value of the azimuth reference ($\Psi$ref) by comparing a first value of the azimuth reference ($\Psi$ref) and a second value of the azimuth reference ($\Psi$ref), and by accounting for at least one of validity and covariance of the first and second values.

6. The method of claim 1, further comprising applying the order to automatically steer a nose landing gear wheel of the aircraft towards a physical path corresponding to the target trajectory.

7. The method of claim 6, wherein the automatic steering includes converting the command into a steering wheel actuation command and applying the steering wheel actuation command to control a steering wheel of the aircraft.

8. A device to guide an aircraft in ground movement, the device comprises:
   a beacon unit configured to:
      determine a virtual follower point representing a current position of the aircraft;
      generate a virtual circle centered on the virtual follower point and having a radius based on a current speed and/or current acceleration of the aircraft and based on data representing kinematics of the aircraft, and
      generate a virtual dynamic point representing a desired location of the aircraft along a virtual target trajectory for the aircraft based on an intersection between the virtual target trajectory and the virtual circle, and
   a control unit configured to generate an order including information to guide the aircraft towards a physical position on the ground corresponding to the virtual dynamic point, and to enable the aircraft to be driven along the target trajectory.

9. The device in claim 8, wherein the beacon unit includes a navigation unit configured to generate a virtual circle having a center at a follower point on the aircraft, wherein the virtual dynamic point is at an intersection of the virtual circle and the target trajectory.

10. The device in claim 9, wherein the navigation unit is configured to determine an azimuth reference angle ($\Psi$ref) as an angle between a straight line extending through the dynamic point and the follower point, and an axis of a local reference system centered on the dynamic point, and the beacon unit is configured to use the azimuth reference angle ($\Psi$ref) to generate the order.

11. The device in claim 10, wherein the beacon unit further comprises a guiding unit configured to determine an azimuth error ($\Delta\Psi$) associated with the azimuth ($\Psi$ref), wherein the azimuth error ($\Delta\Psi$) is an angle formed by the straight line extending through the dynamic point TP and the follower point FP, and a longitudinal axis of the aircraft AC which passes through the follower point FP, and
   wherein the azimuth error ($\Delta\Psi$) is used to generate the order.

12. The device in claim 11, wherein the beacon unit includes a consolidation unit configured to determine a consolidated value of the azimuth reference ($\Psi$ref) by comparing a first value of the azimuth reference and a second value of the azimuth reference, and accounting for a validity and a covariance of the first and second values, wherein the consolidated value is used to generate the order.

13. The device in claim 8, wherein the control unit is configured to generate the command by:
   generating a first command to move a nose landing gear of the aircraft towards to the target trajectory; and
   converting the first command into a second command to control a steering wheel of the aircraft.

14. A method to automatically move an aircraft along a physical taxi path on the ground, the method comprising:
   automatically determining a virtual target trajectory corresponding to the physical taxi path to be taken by the aircraft;
   automatically determining a virtual circle centered on a virtual follower point corresponding to a physical position on the aircraft;
   calculating a radius of the virtual circle based on a current speed and/or current acceleration of the aircraft moving over the ground;
   automatically selecting a virtual dynamic point as a point of intersection between the virtual circle and the virtual target trajectory; and
   automatically generating an order to guide movement of the aircraft on the ground towards a physical point on the taxi path corresponding to the virtual dynamic point.

15. The method of claim 14, further comprising:
   calculating an azimuth error $\Delta\Psi$ as an angle between a longitudinal axis of the aircraft and a line extending through the dynamic point and a virtual point corresponding to a follower point on the aircraft, and
   the order is generated using the azimuth error $\Delta\Psi$.

16. The method of claim 15, wherein the calculation of the azimuth error $\Delta\Psi$ further includes calculating a lateral offset of the aircraft as a shortest distance between the follower point and the taxi line.

17. The method of claim 14, further comprising determining the physical position of the aircraft based on kinematic data of prior movements of the aircraft.

18. The method of claim 14, further comprising automatically moving the aircraft using the order to guide the aircraft towards the physical point corresponding to the virtual dynamic point.

* * * * *